US012571606B2

(12) United States Patent
Xu

(10) Patent No.: US 12,571,606 B2
(45) Date of Patent: Mar. 10, 2026

(54) MUZZLE FLASH SIMULATOR AND LIGHT TRACK GENERATION METHOD

(71) Applicant: SANGTIAN TECHNOLOGY (SHENZHEN) CO., LTD, Shenzhen City (CN)

(72) Inventor: Shuxi Xu, Shenzhen City (CN)

(73) Assignee: SANGTIAN TECHNOLOGY (SHENZHEN) CO., LTD, Shenzhen City (CN)

( * ) Notice: Subject to any disclaimer, the term of this patent is extended or adjusted under 35 U.S.C. 154(b) by 230 days.

(21) Appl. No.: 18/393,560

(22) Filed: Dec. 21, 2023

(65) Prior Publication Data

US 2024/0393075 A1 Nov. 28, 2024

(30) Foreign Application Priority Data

May 27, 2023 (CN) ......................... 202310613377.3
Oct. 30, 2023 (CN) ......................... 202311426705.5

(51) Int. Cl.

*F41A 33/02* (2006.01)
*F21S 10/04* (2006.01)
*F21V 23/04* (2006.01)
*F21V 33/00* (2006.01)
*F21Y 113/13* (2016.01)

(Continued)

(52) U.S. Cl.

CPC ............. *F41A 33/02* (2013.01); *F21S 10/043* (2013.01); *F21V 23/0442* (2013.01); *F21V 33/008* (2013.01); *F21Y 2113/13* (2016.08); *F21Y 2115/10* (2016.08); *F41B 11/71* (2013.01)

(58) Field of Classification Search

CPC ....... F41A 33/02; H05B 47/105; H05B 47/16; A63F 13/21; A63F 13/42; A63F 9/0291; A63F 9/0278

See application file for complete search history.

(56) References Cited

U.S. PATENT DOCUMENTS 9,746,272 B2 * 8/2017 Lowrance ............... F41A 33/02
10,041,757 B2 * 8/2018 Grossnickle ............ F41B 6/003
2018/0163949 A1 * 6/2018 Joseph ................ F21V 23/0407

(Continued)

FOREIGN PATENT DOCUMENTS

TW 202227773 A 7/2022

*Primary Examiner* — James S. McClellan

(74) *Attorney, Agent, or Firm* — Li & Cai Intellectual Property Office

(57) ABSTRACT

A muzzle flash simulator and a light track generation method are provided. The muzzle flash simulator includes: a projectile channel provided inside the muzzle flash simulator, and the projectile channel coaxial with a flight trajectory of a projectile; at least one projectile sensor connected to a controller and preset to transmit a trigger signal to the controller when detecting the projectile passes through the projectile channel; in which the controller is configured to output at least two control signals that periodically change according to the trigger signal; and at least one group of flash simulation light sources connected to the controller, in which the at least one group of flash simulation light sources includes at least two light-emitting elements having different colors, and the light-emitting elements are configured to periodically emit lights having different colors to the projectile according to the control signals to form a light track.

7 Claims, 12 Drawing Sheets

(51) Int. Cl.

| | |
|---|---|
| *F21Y 115/10* | (2016.01) |
| *F41B 11/71* | (2013.01) |

(56) References Cited

U.S. PATENT DOCUMENTS

| | | | | |
|---|---|---|---|---|
| 2022/0178644 | A1 * | 6/2022 | Chang | H05B 47/105 |
| 2023/0258425 | A1 * | 8/2023 | Chang | F41A 33/02 102/502 |

* cited by examiner

MUZZLE FLASH SIMULATOR AND LIGHT TRACK GENERATION METHOD

FIELD OF THE DISCLOSURE

The present disclosure relates to the technical field of toy gun accessories, and more particularly to a muzzle flash simulator and a light track generation method.

BACKGROUND OF THE DISCLOSURE

Currently, when playing Airsoft games, in order to simulate the muzzle flash effect of a real gun or to facilitate the observation of the flight trajectory of the projectile, a muzzle flash simulator for a toy gun is often used. The flash simulation source on the muzzle flash simulator is used to illuminate the flight trajectory of the projectile, or the ultraviolet lamp of a luminous charger is used to illuminate the luminous projectile that can absorb light energy, so that the luminous projectile continues to emit luminous light for a short period of time after leaving the luminous charger, thereby achieving the purpose of displaying the flight trajectory of the projectile.

However, traditional muzzle flash simulators usually have a single color and a single effect, and require the use of luminous projectile to produce a luminous effect, which is expensive.

SUMMARY OF THE DISCLOSURE

Based on this, it is necessary to provide a muzzle flash simulator and a light track generation method to solve the above technical problems, so as to solve the problem in the existing technology that the light track has a single color and requires the use of luminous projectile to produce a luminous effect, thus leading to the problem of higher costs.

In order to achieve the above-mentioned purpose, the present disclosure provides a muzzle flash simulator configured to be installed at a muzzle of a toy air gun, and the muzzle flash simulator includes: a projectile channel provided inside the muzzle flash simulator, and the projectile channel coaxial with a flight trajectory of a projectile; a projectile sensor connected to a controller and configured to transmit a trigger signal to the controller when detecting the projectile passes through the projectile channel; in which the controller is preset to output at least two control signals that periodically change according to the trigger signal; and at least one group of flash simulation light sources connected to the controller, in which the at least one group of flash simulation light sources includes at least two light-emitting elements having different colors, and the light-emitting elements are configured to periodically emit lights having different colors to the projectile according to the control signals to form a light track.

In preferred embodiments, at least two projectile sensors are provided and configured to correspondingly transmit the trigger signals to the controller to trigger the controller to turn on control signals of different control channels, so as to correspondingly control turn on, turn off and luminous brightness of the light-emitting elements having different colors.

In preferred embodiments, the at least two projectile sensors are arranged in parallel in the projectile channel along a direction of the flight trajectory of the projectile, and a distance between adjacent projectile sensors is less than a predetermined distance threshold.

In preferred embodiments, at least two rows of projectile sensor group are provided in the projectile channel along an axis side of the flight trajectory of the projectile, and each of the at least two rows of projectile sensor group includes at least one projectile sensor.

In preferred embodiments, the controller includes: a signal generator circuit configured to output the at least two control signals that periodically change to correspondingly control turn on, turn off and luminous brightness of the light-emitting elements having different colors.

In preferred embodiments, a ratio of a positive voltage duration of the control signal to a period within a cycle is constant.

In preferred embodiments, the positive voltage duration is calculated by the following formula:

$$3T/2n$$

in which, T is the period, T is less than 0.1 seconds, n is a number of colors of the light-emitting element, and n is greater than 1.

In preferred embodiments, a phase difference between two adjacent control signals is calculated by the following formula:

$$360°/n$$

in which, n is a number of colors of the light-emitting element, and n is greater than 1.

In order to achieve the above-mentioned purpose, the present disclosure further provides a light track generation method applied to the aforementioned muzzle flash simulator, including the following steps: generating, by the projectile sensor, the trigger signal when detecting the projectile passes through the projectile channel inside the muzzle flash simulator; receiving, by the controller, the trigger signal and outputting the at least two control signals that periodically change; and periodically emitting lights having different colors, by the light-emitting elements having different colors, to the projectile according to the control signals to generate a corresponding light track according to a flight trajectory of the projectile.

In preferred embodiments, multiple projectile sensors are provided, and the step of receiving, by the controller, the trigger signal and outputting the at least two control signals that periodically change includes: receiving, by the controller, the trigger signal transmitted by each of the multiple projectile sensors, triggering and opening different control channels according to the trigger signal transmitted by each of the multiple projectile sensors, and outputting corresponding control signals that periodically change through the different control channels to correspondingly control turn-on, turn-off and luminous brightness of the light-emitting elements having different colors.

In the present disclosure, the muzzle flash simulator and the light track generation method are provided. The muzzle flash simulator includes: the projectile channel provided inside the muzzle flash simulator, in which the projectile channel is coaxial with the flight trajectory of the projectile; the projectile sensor connected to the controller and configured to transmit the trigger signal to the controller when detecting the projectile passes through the projectile channel; in which the controller is preset to output the at least two control signals that periodically change according to the trigger signal; and the at least one group of flash simulation light sources connected to the controller, in which the at least one group of flash simulation light sources includes the at least two light-emitting elements having different colors, and the light-emitting elements are configured to periodically emit lights having different colors to the projectile according to the control signals to form a light track. The projectile passing through the projectile channel is detected by the projectile sensor, and when detecting the projectile passes through the projectile channel, the trigger signal is generated. After receiving the trigger signal, the controller generates periodically changing multi-channel signal waveforms by setting the period, phase difference and positive voltage duration of adjacent control signals, which is used to control the light-emitting elements having various colors to produce mixed colorful effects. Therefore, a control software can be simplified and requirements for controller performance can be reduced.

BRIEF DESCRIPTION OF THE DRAWINGS

In order to explain the embodiments of the present disclosure or the technical solutions in the prior art more clearly, the drawings needed to be used in the description of the embodiments or the prior art will be briefly introduced below. Obviously, the drawings in the following description are only some embodiments of the present disclosure. For those of ordinary skill in the art, other drawings can be obtained based on these drawings without exerting any creative effort.

DETAILED DESCRIPTION OF THE EXEMPLARY EMBODIMENTS

The technical solutions in the embodiments of the present disclosure will be clearly and completely described below with reference to the accompanying drawings in the embodiments of the present disclosure. Obviously, the described embodiments are part of the embodiments of the present disclosure, rather than all of them. Based on the embodiments of the present disclosure, all other embodiments obtained by those of ordinary skill in the art without making creative efforts fall within the scope of protection of the present disclosure.

Figure 1:
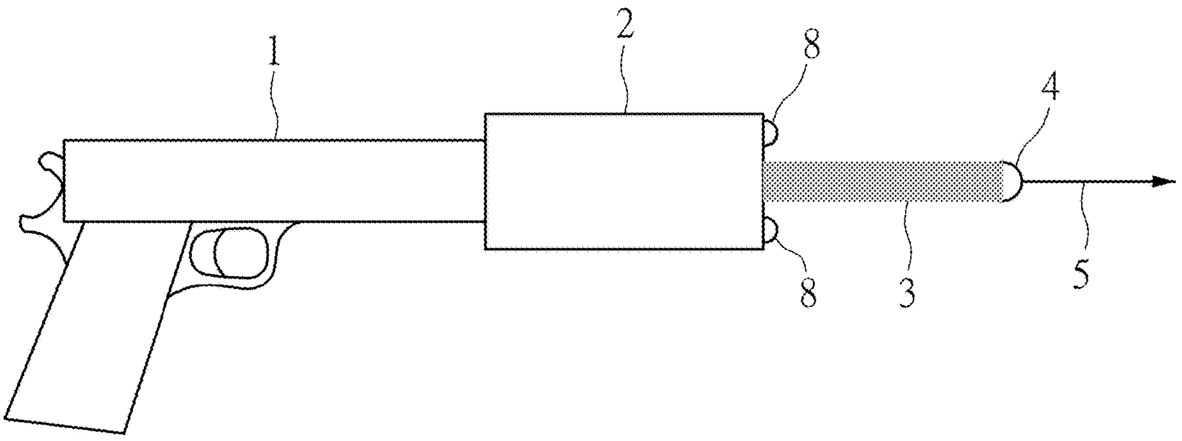
FIG. 1 is a schematic structural diagram of an assembly of a toy air gun and a muzzle flash simulator according to one embodiment of the present disclosure.
Figure 2:
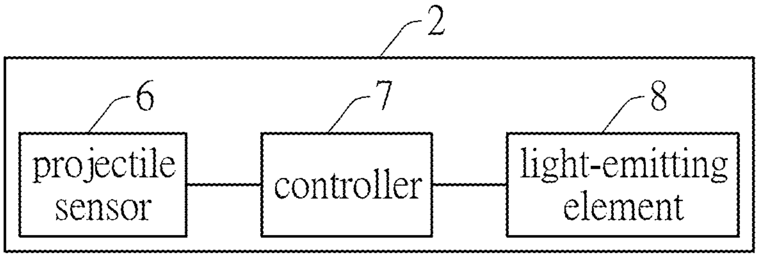
FIG. 2 is a first schematic module diagram of the muzzle flash simulator according to one embodiment of the present disclosure.

In one embodiment, as shown in FIG. 1 and FIG. 2, a muzzle flash simulator 2 is provided. The muzzle flash simulator 2 is installed at a muzzle of a toy air gun 1 and includes: a projectile channel 9, a projectile sensor 6, a controller 7, and at least one group of flash simulation light sources 8. The projectile channel 9 is provided inside the muzzle flash simulator 2, in which the projectile channel 9 is coaxial with a flight trajectory 5 of a projectile 4. The projectile sensor 6 is connected to a controller 7 and is used to transmit a trigger signal to the controller 7 when detecting a projectile passes through the projectile channel 9. The controller 7 is preset to output at least two control signals that periodically change according to the trigger signal. The at least one group of flash simulation light sources 8 is connected to the controller 7. The at least one group of flash simulation light sources 8 includes at least two light-emitting elements having different colors, and the light-emitting elements are used to periodically emit lights having different colors to the projectile 4 according to the control signals to form a light track 3. In the present disclosure, the projectile passing through the projectile channel is detected by the projectile sensor. When detecting that a projectile passes through, the trigger signal is generated. After receiving the trigger signal, the controller generates periodically changing multi-channel signal waveforms by setting the period, phase difference and positive voltage duration of adjacent control signals, which is used to control the light-emitting elements having various colors to produce mixed colorful effects. Therefore, a control software can simplified and the requirements for controller performance can be reduced.

The toy air gun 1 can be one of a toy gun, a BB gun, a foam dart blaster, a gel ball gun, an air BB gun, an airsoft gun, and a paintball gun.

The muzzle flash simulator 2 can adopt a shape of muzzle accessories such as a flash hider, a suppressor, a muzzle brake or a silencer. The muzzle flash simulator 2 can be detachably connected to the muzzle of the toy air gun 1, that is, an end of a barrel. For example, the muzzle flash simulator 2 can be detachably connected to the muzzle of the toy air gun 1 through buckles, threaded connections, etc., so that replacement and maintenance can be made at any time.

The controller 7 can be a PCB control circuit board, on which is provided a control chip such as a MCU and a single-chip microcomputer, and is configured with a corresponding control circuit to achieve electrical connection with the flash simulation light source 8 and the projectile sensor 6, and can control luminous brightness, color, turn-on and turn-off of the flash simulation light source 8 through the control chip.

The projectile sensor 6 can be a Hall switch sensor, an infrared sensor, etc.

The flash simulation light source 8 can be used to generate lights having different colors, and the lights periodically change the color under the control of the controller 7. The flash simulation light source 8 can illuminate the projectile 4 away from the muzzle flash simulator 2 and flying along the flight trajectory 5, and uses a surface of the projectile 4 to reflect the lights having different colors into a human eye, causing richly colored light tracks 3 in the air due to a visual residual effect of the human eye.

In an implementation scenario, the muzzle flash simulator 2 is connected to the muzzle of the toy air gun and is located at the end of the barrel. The projectile channel 9 inside the muzzle flash simulator 2 is coaxial with the barrel. When the toy air gun 1 is launched, the projectile 4 passes through the projectile channel 9 and flies outward. The projectile sensor 6 detects the projectile 4 and transmits the trigger signal. Then the projectile 4 moves away from the projectile channel 9. At this time, when the controller 7 receives the trigger signal from the projectile sensor 6, the controller 7 can activate the control channel to generate the control signal. Under the control of the control signal, different light-emitting elements correspondingly generate strong light to illuminate the projectile 4 away from the projectile channel 9, the strong light is reflected into the human eye through the surface of the projectile 4, and the human eye will observe the flight trajectory of the projectile 4 in the air. Since the control signal generated by the controller 7 changes periodically, the luminous effects of the light-emitting elements having different colors change periodically under the control of the control signal while the projectile 4 is flying, and the color of the flight trajectory of the projectile 4 also changes accordingly. Due to the visual residual effect of the human eye, when the period of the control signal generated by the controller 7 is less than the residual time of the human eye's vision, the human eye will simultaneously observe a long light track in the air consisting of small light tracks of different colors connected in series, as if a rainbow.

Figure 3:
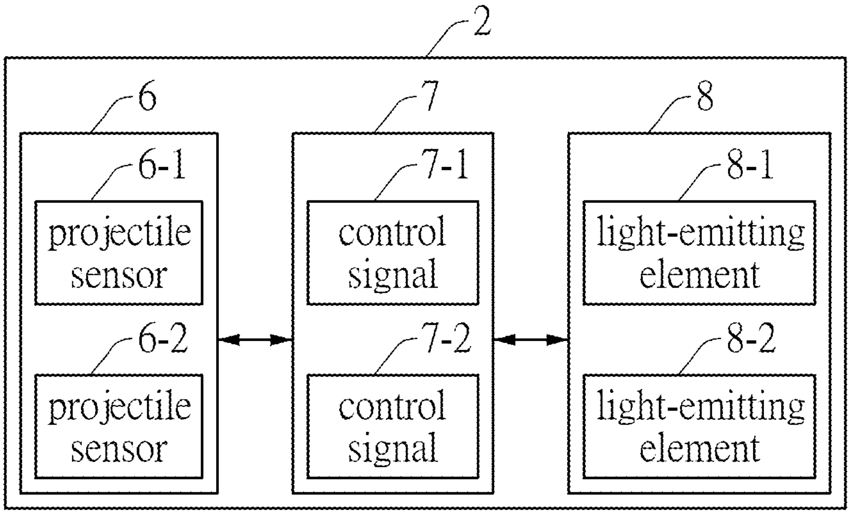
FIG. 3 is a second schematic module diagram of the muzzle flash simulator according to one embodiment of the present disclosure.
Figure 4:
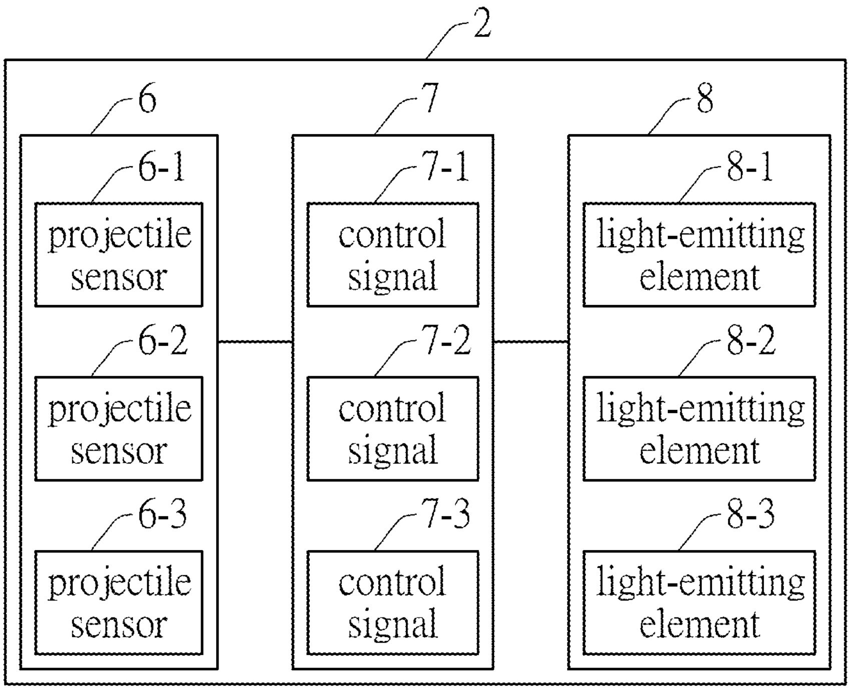
FIG. 4 is a third schematic module diagram of the muzzle flash simulator according to one embodiment of the present disclosure.

In an embodiment of the present disclosure, at least two projectile sensors 6 are provided, which are used to correspondingly transmit the trigger signals to the controller 7. The trigger controller 8 is used to turn on the control signals of different control channels to control turn-on, turn-off and luminous brightness of the light-emitting elements having different colors. Reference is made to FIG. 3 and FIG. 4, in which FIG. 3 shows that two projectile sensor 6 are provided. The trigger signals generated by the two projectile sensors 6 correspondingly trigger the controller 7 to generate two control signals, which then respectively control the two light-emitting elements to operate. FIG. 4 shows a schematic diagram in which three projectile sensors 6 are provided. The trigger signals generated by the three projectile sensors 6 correspondingly trigger the controller 7 to generate three control signals, which then respectively control the three light-emitting elements to operate.

It can be understood that a number of the projectile sensor 6 is the same as a number of the light-emitting element, and the number of the projectile sensor 6 is the same as a number of control signal output by different control channels of the controller 7.

Figure 9:
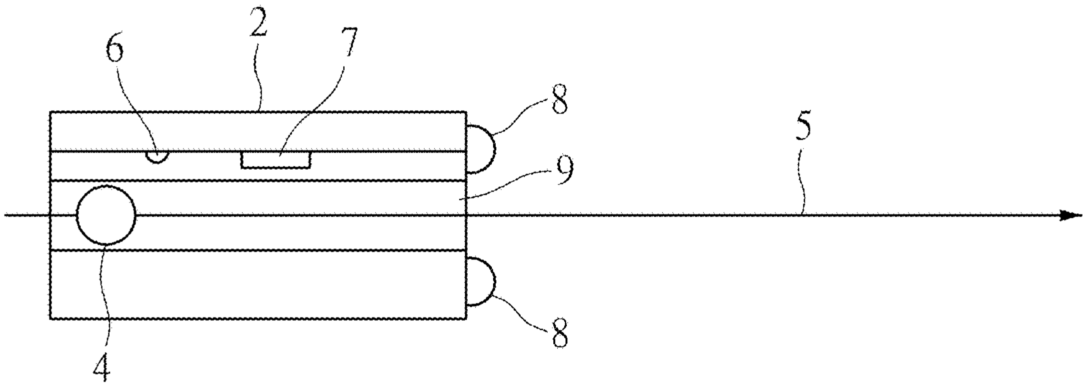
FIG. 9 is a first schematic diagram of a projectile starting to run according to one embodiment of the present disclosure.
Figure 10:
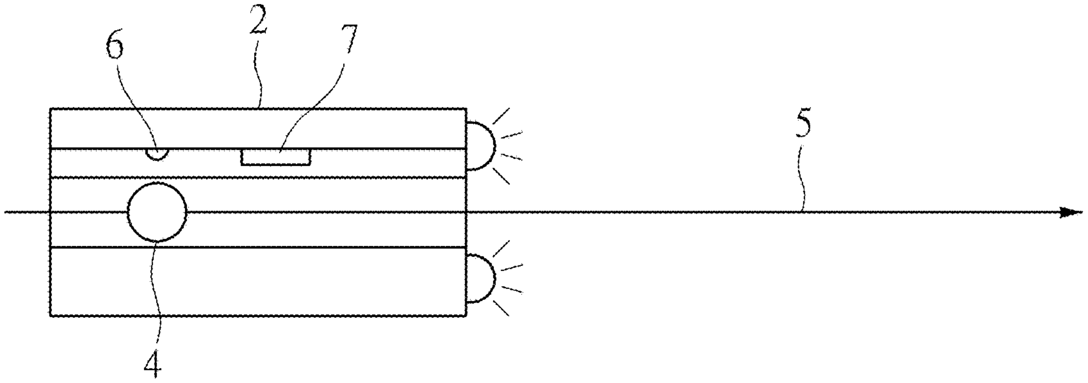
FIG. 10 is a schematic diagram showing when detecting the projectile runs in the projectile channel according to one embodiment of the present disclosure.
Figure 11:
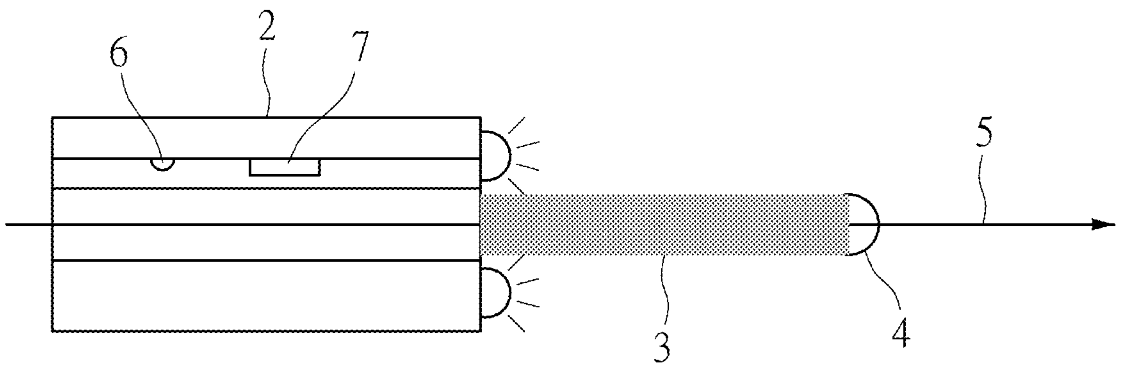
FIG. 11 is a first schematic diagram showing a light track is produced after the projectile moves away from the projectile channel according to one embodiment of the present disclosure.
Figure 12:
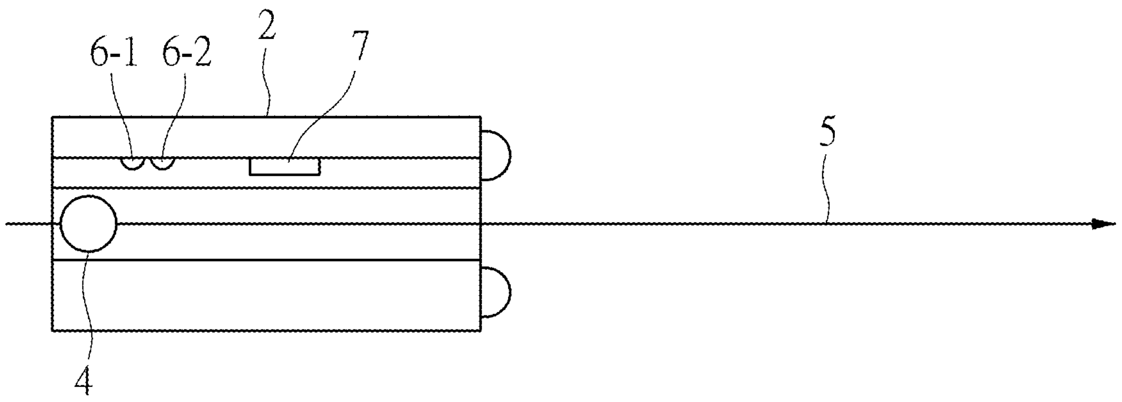
FIG. 12 a second schematic diagram of the projectile starting to run according to one embodiment of the present disclosure.
Figure 13:
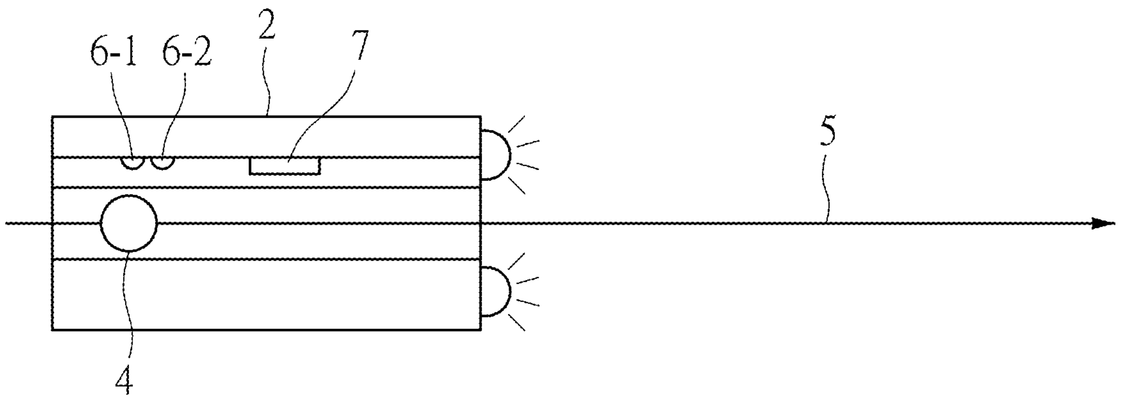
FIG. 13 is a schematic diagram, in which the projectile passing through the projectile sensor 6-1 is detected when running in the projectile channel according to one embodiment of the present disclosure.
Figure 14:
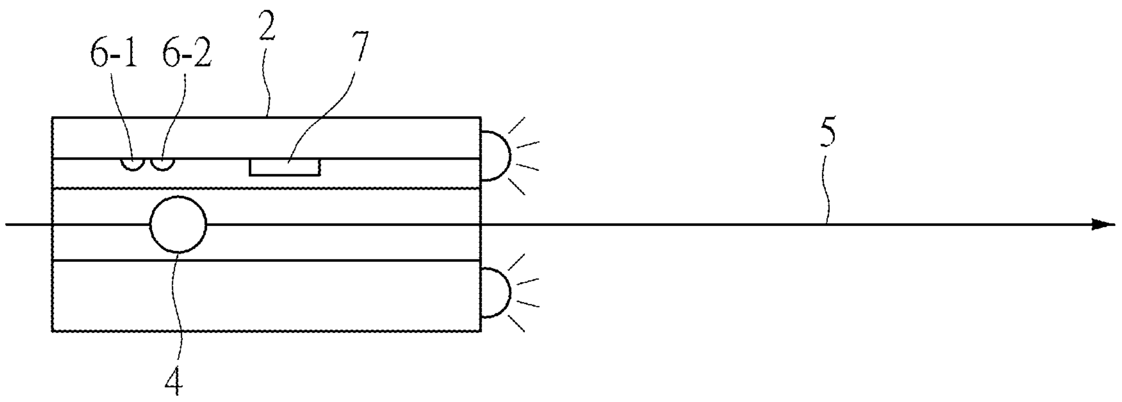
FIG. 14 is a schematic diagram, in which the projectile passing through the projectile sensor 6-2 is detected when running in the projectile channel according to one embodiment of the present disclosure.
Figure 15:
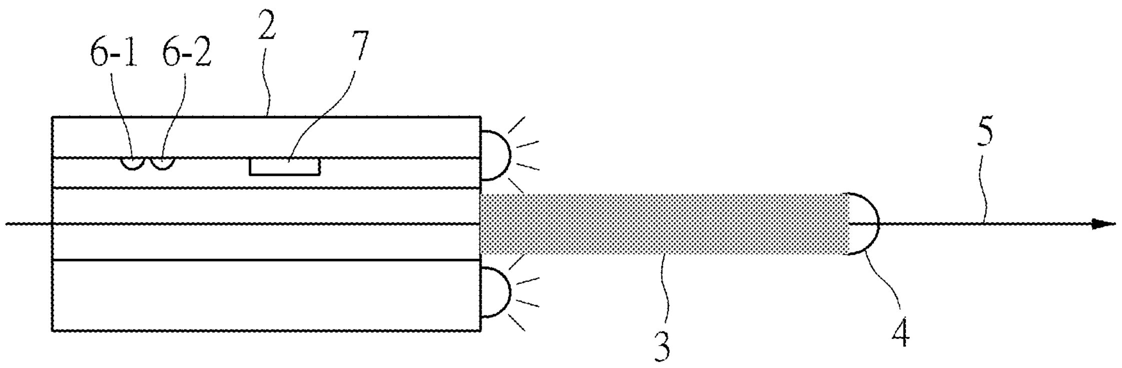
FIG. 15 is a second schematic diagram showing when a light track is generated after the projectile moves away from the projectile channel according to one embodiment of the present disclosure.

As shown in FIG. 9 to FIG. 11, in an implementation scenario, the projectile sensor 6 can be arranged in parallel along the flight direction of the projectile 4. For example, the projectile sensor 6 includes a projectile sensor 6-1 and a projectile sensor 6-2, which are correspondingly connected to the control 7. The controller 7 may include two control channels for respectively outputting the control signal 7-1 and the control signal 7-2. Besides, the flash simulation light source 8 may include a light-emitting element 8-1 and a light-emitting element 8-2, and each projectile sensor can control a light-emitting element to emit light through the controller 7. For example, the projectile sensor 6-1 can control the controller 7 to start the control channel and output the control signal 7-1, which is used to control the light-emitting element 8-1 to emit the corresponding color. In the same way, the projectile sensor 6-2 can control the controller 7 to start the control channel and output the control signal 7-2, which is used to control the light-emitting element 8-2 to emit light of the corresponding color.

In an implementation scenario, the muzzle flash simulator 2 is connected to the muzzle of the toy air gun and is located at the end of the barrel. The projectile channel 9 inside the muzzle flash simulator 2 is coaxial with the barrel. When the toy air gun is launched, the projectile 4 is launched through the projectile channel, and multiple projectile sensors 6 are triggered one by one, then the projectile 4 moves away from the projectile channel. When the controller 7 receives the trigger signal of each projectile sensor 6, it generates a corresponding control signal according to the trigger signal, the light-emitting elements having different colors correspondingly generate a strong light under a control of the control signals transmitted by different control channels and illuminate the projectile 4 away from the projectile channel 9, the strong light is reflected into the human eye through the surface of the projectile 4, and the human eye will observe the flight trajectory of the projectile in the air. Since the projectile 4 flies fast enough, the time interval between the projectile 4 passing through the surfaces of the plurality of projectile sensors 6 and the delay time between triggering different sensors are short enough, almost as if the plurality of projectile sensors 6 are triggered at the same time, such that the control signals of multiple different channels are almost turned on at the same time. Since the control signals of different channels can control the light-emitting elements having different colors respectively, and the control signals generated by the controller 7 change periodically, the luminous effects of the light-emitting elements having different colors change periodically under the control of the control signal while the projectile 4 is flying, and the color of the flight trajectory of the projectile 4 also changes accordingly. Due to the visual residual effect of the human eye, when the period of the control signal generated by the controller 7 is less than the residual time of the human eye's vision, the human eye will simultaneously observe a long light track in the air consisting of small light tracks of different colors connected in series, as if a rainbow.

Referring to FIGS. 12 to 16, in an embodiment of the present disclosure, when of the multiple projectile sensors 6 are provided, the multiple projectile sensors 6 can be arranged in parallel in the projectile channel 9 along the direction of the flight trajectory of the projectile 4, for example, on an inner wall of the projectile channel 9, so that the projectile 4 passing through the projectile channel 9 can be detected, and a block of the flight trajectory of the projectile 4 can be avoided. A distance between adjacent projectile sensors 6 is less than a predetermined distance threshold. For example, the predetermined distance threshold can be a flight speed of the projectile multiplied by T/2n, where T is a period, n is the number of colors of the light-emitting element, and n is greater than 1, so that a closer distance between adjacent projectile sensors 6 results in a smaller difference in triggering time.

Figure 16:
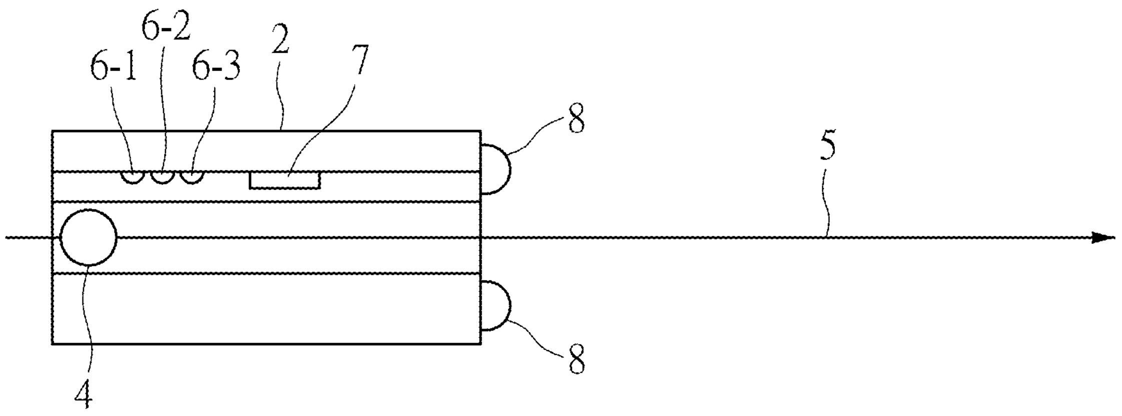
FIG. 16 is a structural schematic diagram of the muzzle flash simulator disposed with three projectile sensors arranged in parallel according to one embodiment of the present disclosure.

FIG. 12 to FIG. 15 show schematic structural diagrams of the projectile sensor 6-1 and the projectile sensor 6-2 being arranged in parallel on the inner wall of the projectile channel 9. FIG. 16 shows a schematic structural diagram of the projectile sensor 6-1, the projectile sensor 6-2 and the projectile sensor 6-3 being arranged in parallel on the inner wall of the projectile channel 9. Taking the projectile sensor 6-1 and the projectile sensor 6-2 as an example, when the distance between the projectile sensor 6-1 and the projectile sensor 6-2 is less than the predetermined distance threshold, a time interval for the projectile 4 to pass through the surfaces of the projectile sensor 6-1 and the projectile sensor 6-2 and the delay time between triggering different sensors are short enough, almost as if the projectile sensor 6-1 and the projectile sensor 6-2 are triggered approximately at the same time, and the control signals of multiple different channels are turned on approximately at the same time, so that the light-emitting elements having different colors can be controlled to emit lights having different colors almost simultaneously, thereby forming a light track similar to a rainbow.

In an embodiment of the present disclosure, when the multiple projectile sensors 6 are provided, at least two rows of projectile sensor group are provided on the axis side along the flight trajectory of the projectile 4 in the projectile channel 9, and each row of projectile sensor group has at least one projectile sensor 6, for example, on the inner wall of an axis side of the projectile channel 9. For example, when the number of projectile sensors in the projectile sensor group is the same, two rows of projectile sensor group can be arranged oppositely on upper and lower sides or front and rear sides of the projectile channel 9 or the two rows of projectile sensor group can be arranged oppositely. The projectile sensor group in the rows are arranged at a certain distance from each other, and in order to make the time when the projectile sensor group in the two rows detect the projectile 4 similar or the same, the projectile sensors in the projectile sensor group in the two rows can be arranged at equidistant distances, for example, the location is the same distance from the muzzle of the gun. By arranging the projectile sensor 6 on the inner wall of the projectile channel 9, the projectile 4 passing through the projectile channel 9 can be detected, and a block of the flight trajectory of the projectile 4 can be avoided. For example, when the projectile sensors 6 include the projectile sensor 6-1 and the projectile sensor 6-2, the projectile sensor 6-1 and the projectile sensor 6-2 can be relatively arranged on the upper and lower sides or the front and rear sides of the projectile channel 9. When the projectile 4 passes through the projectile channel, the projectile sensor 6-1 and the projectile sensor 6-2 can be triggered at the same time, and generate the trigger signals respectively to control different light-emitting elements to emit light through the controller 7.

It can be understood that the number of projectile sensors in each row of projectile sensor group can be different. For example, when the first row of projectile sensor group includes two projectile sensors and the second row of projectile sensor group includes one projectile sensor, taking the projectile sensor 6-1, the projectile sensor 6-2 and the projectile 6-3 as an example, two projectile sensors 6 can be provided on the upper side of the inner wall of the projectile channel 9 and one projectile sensor 6 can be provided on the lower side, or two projectile sensors 6 can be provided on the lower side and one projectile sensor 6 can be provided on the upper side. Alternatively, two projectile sensors 6 are provided on the front side of the projectile channel 9 and one projectile sensor 6 is provided on the rear side, or two projectile sensors 6 are provided on the rear side and one projectile sensor 6 is provided on the front side. Alternatively, the two rows of projectile sensor group may be arranged in parallel on the inner wall of the axis side of the projectile channel 9 or the like.

The front and rear sides refer to left and right sides of the projectile's flight trajectory, and the upper and lower sides refer to upper and lower sides of the projectile's flight trajectory.

In an implementation scenario of the present disclosure, when the projectile sensor group includes multiple rows, such as 4 rows or 8 rows, and each row includes the same number of projectile sensors 6, the projectile sensors 6 can be arranged equidistantly around the inner wall of the projectile channel 9. Since the distance of each projectile sensor 6 is the same, the time it takes to detect the projectile 4 is almost the same, so that the light-emitting element emits strong light to the projectile almost simultaneously.

Figure 5:
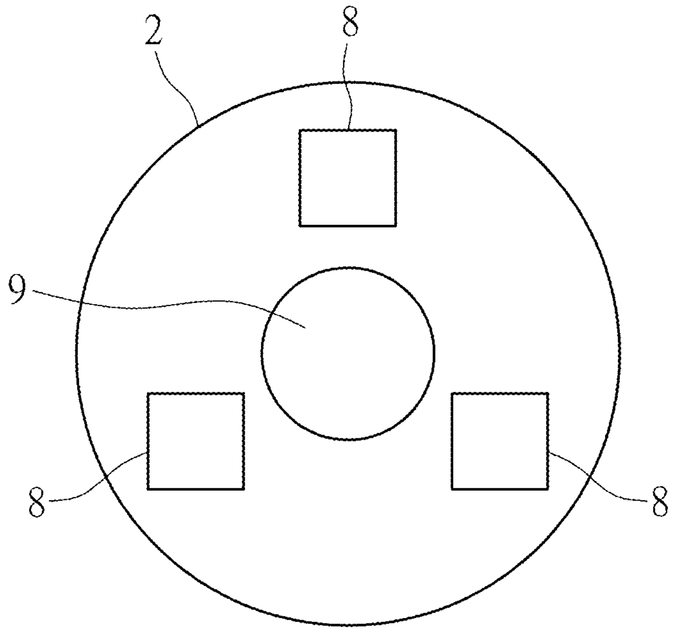
FIG. 5 is a first schematic left side view of the muzzle flash simulator according to one embodiment of the present disclosure.
Figure 6:
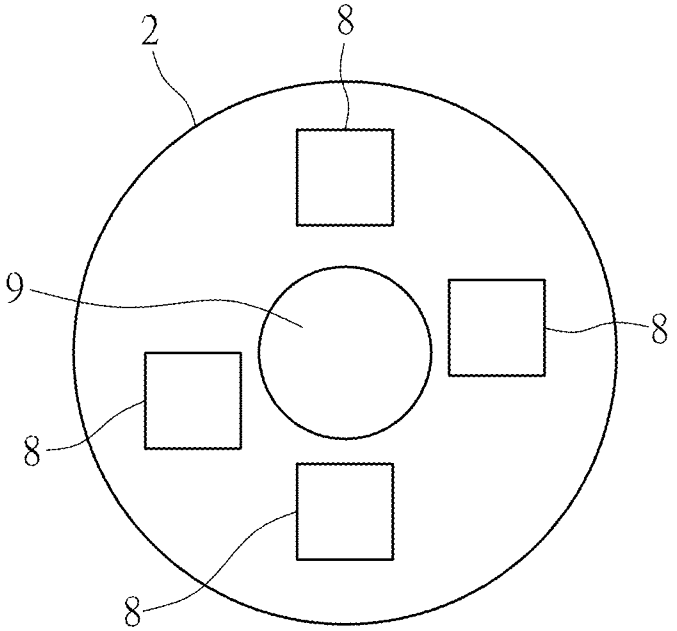
FIG. 6 is a second schematic left side view of the muzzle flash simulator according to one embodiment of the present disclosure.
Figure 7:
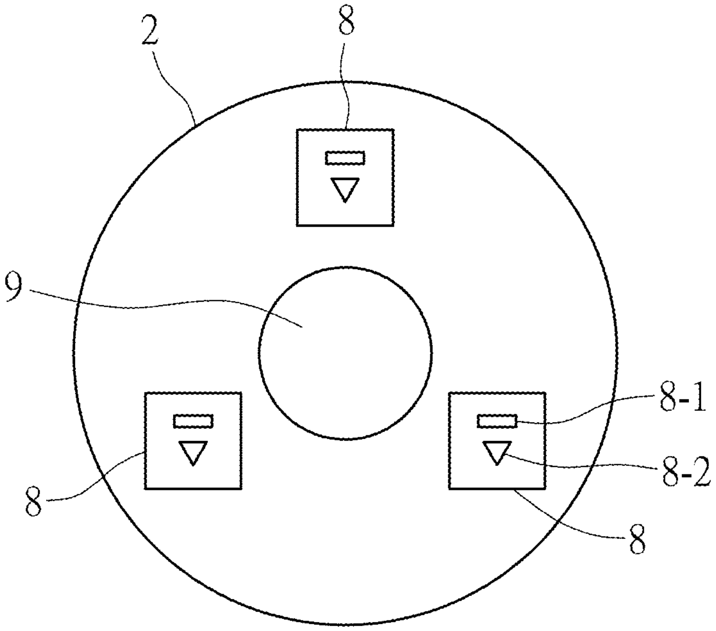
FIG. 7 is a third schematic left side view of the muzzle flash simulator according to one embodiment of the present disclosure.
Figure 8:
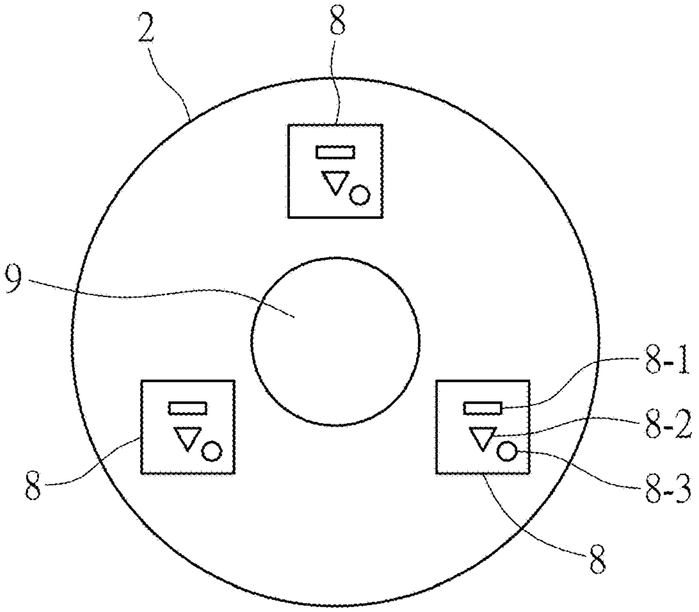
FIG. 8 is a fourth schematic left side view of the muzzle flash simulator according to one embodiment of the present disclosure.

In the embodiments of the present disclosure, the flash simulation light source 8 includes at least one group, and each group of the flash simulation light sources 8 can include at least two light-emitting elements disposed at the front end of the muzzle flash simulator 2, that is, close to one end of the gun and located outside the projectile channel 9. Reference is made to FIG. 5, in which a schematic structural diagram of three groups of flash simulation light sources 8 is shown. Reference is made to FIG. 6, in which a schematic structural diagram of four groups of flash simulation light sources 8 is shown. The flash simulation light source 8 can be disposed equidistantly around the outside of the projectile channel 9, and each group of flash simulation light sources 8 can be provided with at least two light-emitting elements. Reference is made to FIGS. 7 and 8, in which two light-emitting elements and three light-emitting elements are correspondingly provided in each group of flash simulation light sources 8, which are the first light-emitting element 8-1 and the second light-emitting element 8-2 as shown in FIG. 7, or the first light-emitting element 8-1, the second light-emitting element 8-2 and the third light-emitting element 8-3 as shown in FIG. 8. The first light-emitting element 8-1, the second light-emitting element 8-2 and the third light-emitting element 8-3 can be used to emit lights having different colors respectively, for example, emitting red light, blue light, green light, etc.

The light-emitting element can be a light-emitting diode.

In the embodiments of the present disclosure, the controller 7 includes: a signal generator circuit configured to output the at least two control signals that periodically change and correspondingly used to control the luminous brightness, turn-on and turn-off of the light-emitting elements having different colors. For example, the light-emitting elements include the first color light-emitting element 8-1 and the second color light-emitting element 8-2, and the control signals include a first control signal and a second control signal, then the first control signal can be used to control luminous brightness, turn-on and turn-off of the first color light-emitting element 8-1, and the second control signal can be used to control luminous brightness, turn-on and turn-off of the second color light-emitting element 8-2.

It can be understood that the light-emitting elements may include at least two light-emitting elements having different colors. The greater number of light sources results in the greater illumination brightness. Further, the greater variety of colors of the light-emitting elements result in mixed colorful colors.

The output signal form of the control signal may be one or any combination of a rectangular wave, a triangular wave or a sine wave. The number of control signals is equal to the number of color types of the light-emitting elements.

The signal generator circuit can be a digital signal generator circuit or an analog signal generator circuit, which can be used to output at least two control signals that periodically change to correspondingly control the luminous brightness, turn-on and turn-off of the light-emitting elements having different colors.

FIG. 9 to FIG. 11 show the operation process of the projectile 4 passing through the projectile channel 9 of the muzzle flash simulator 2 and moving away from the muzzle flash simulator 2 when the projectile 4 is launched along the flight trajectory 5. When one projectile sensor 6 is provided and the projectile sensor 6 detects the passing of the projectile 4 during use, the trigger signal is transmitted to the controller 7 to activate the projectile signal generator circuit of the controller 7 to generate at least two preset periodic control signals to control of the multiple light-emitting elements of the flash simulation light source 8, so as to periodically change the light-emitting color. At this time, the projectile sensor 6 can control the plurality of light-emitting elements to periodically change the light-emitting color through the controller 7.

FIG. 12 to FIG. 16 show the operation processes of the projectile 4 passing through the projectile channel 9 of the muzzle flash simulator 2 and moving away from the muzzle flash simulator 2 when the projectile 4 is launched along the flight trajectory 5. When the multiple projectile sensors are provided, such as the two projectile sensors shown in FIGS. 12 to 14 and the three projectile sensors shown in FIG. 16, taking three projectile sensors as an example, and when the projectile flies through the projectile channel 9, each projectile sensor 6 is triggered one by one. For example, the projectile sensor 6-1, the projectile sensor 6-2 and the projectile sensor 6-3 detect the projectile 4 one by one. When the projectile 4 flies fast enough, it can be considered that the projectile sensor 6-1, the projectile sensor 6-2 and the projectile sensor 6-3 detect the projectile 4 at the same time. At this time, the projectile sensor 6-1, the projectile sensor 6-2 and the projectile sensor 6-3 will correspondingly transmit a trigger signal to the controller 7, which is used to trigger the controller 7 to open different control channels to generate three preset periodic control signals to control the light-emitting elements to periodically change the light-emitting color. At this time, the projectile sensors 6 are used to control the light-emitting elements to periodically change the light-emitting color through the controller 7.

In an embodiment of the present disclosure, the control signal output by the controller 7 changes periodically. Preferably, when the controller 7 generates n control signals, each control signal adopts the same signal period. For example, a period of the first control signal is equal to a period of the second control signal, the period of the second control signal is equal to a period of the third control signal . . . , a period of the $n-1^{th}$ control signal is equal to a period of the $n^{th}$ control signal, and n is a positive integer.

In an embodiment of the present disclosure, the control signal output by the controller 7 has a constant ratio between the positive voltage duration and the period within a cycle, that is, the positive voltage duration/T is constant. Preferably, the following formula is used to calculate the duration of the positive voltage: 3T/2n, where T is the period. Since the residual time is less than 0.1 to 0.4 seconds for human vision, T can be set to less than 0.1 seconds, n is the number of colors of the light-emitting element, and n is greater than 1.

In an embodiment of the present disclosure, a phase difference between two adjacent control signals of the control signal output by the controller 7 is between 0 and 180°, 180° is included, and can be calculated using the following formula: 360°/n, where n is the number of colors of the light-emitting elements, and n is greater than 1.

It can be understood that when the controller 7 generates n control signals, a phase difference between each adjacent control signal can be 360°/n. For example, a phase difference between the second control signal and the first control signal is 360°/n, a phase difference between the third control signal and the second control signal is 360°/n . . . , a phase difference between the $n^{th}$ control signal and the $n-1^{th}$ control signal is 360°/n, and n is a positive integer.

Since the visual residual time of the human eye is 0.1 seconds to 0.4 seconds, when the control signal period T is less than a lower limit of the human visual residual time, i.e., 0.1 seconds, the human eye can observe the regular luminous effect produced by the muzzle flame simulator within a complete control signal period T.

Figure 17:
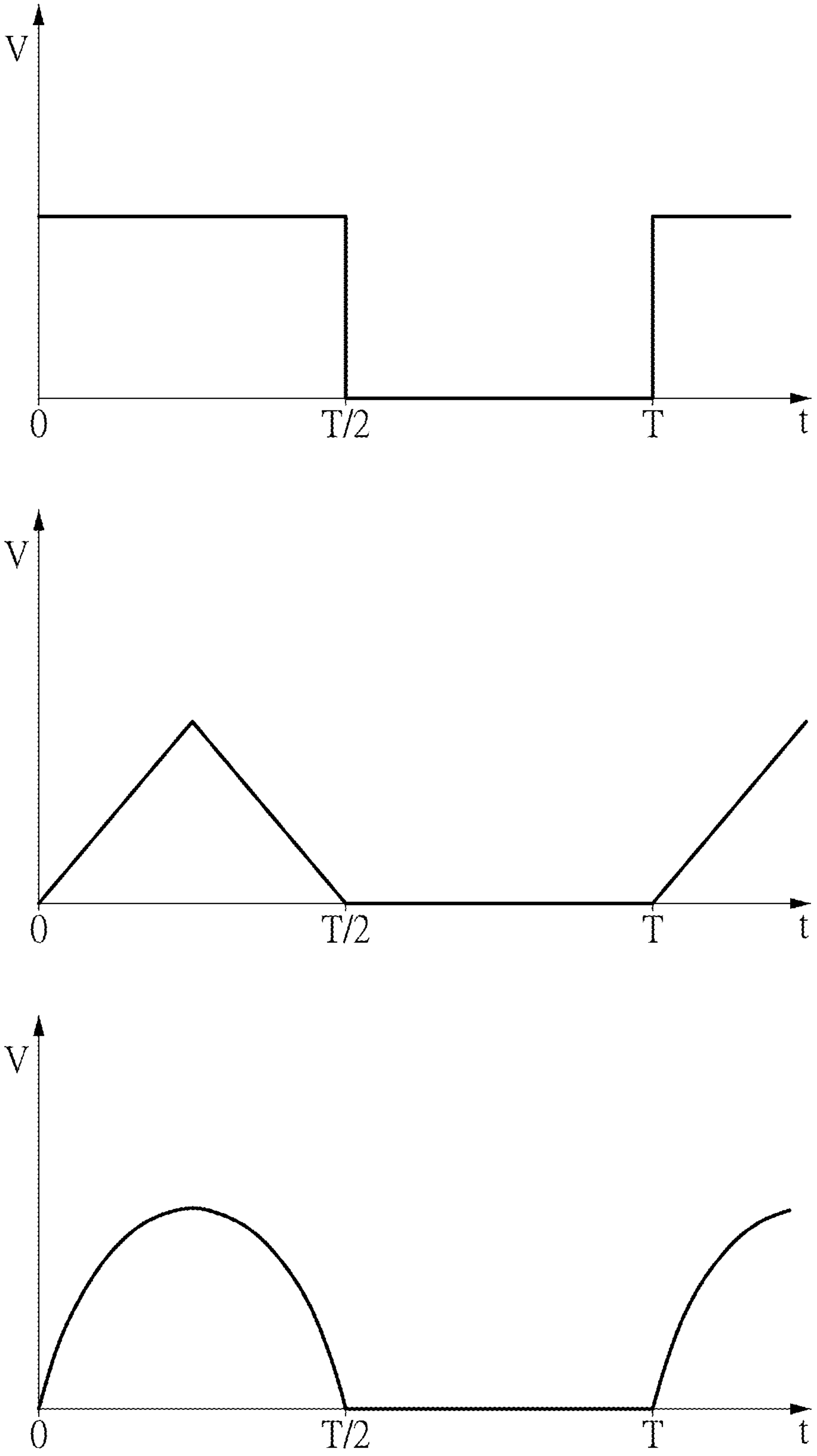
FIG. 17 is a signal waveform diagram showing three waveforms of the control signals according to one embodiment of the present disclosure.

In an embodiment of the present disclosure, referring to FIG. 17, different types of signal waveform diagrams are shown when the control signal has the consistent period of T and the positive voltage time of T/2. Given the ordinate is the voltage V and the abscissa is the time t, an order from top to bottom is the waveform diagrams of the positive voltage part for the rectangular wave signal, the triangular wave signal, and the sine wave signal. It is understandable that since the negative voltage signal cannot be used as an effective control signal during actual implementation, a negative voltage part of the signal is not shown on the waveform diagram.

When the control signal can be a rectangular wave signal, the signal voltage has only two values, and the controlled light-emitting elements have only two light-emitting states.

As a preferred embodiment, the control signal can be a triangular wave signal or a sine wave signal. The voltages of the two signals will continue to change with time, so an infinite number of voltages can be generated, and the light-emitting states of the controlled light-emitting elements are countless. There are countless color combinations after mixing the light-emitting elements having different colors, and the colors of the light tracks produced are more colorful.

Figure 18:
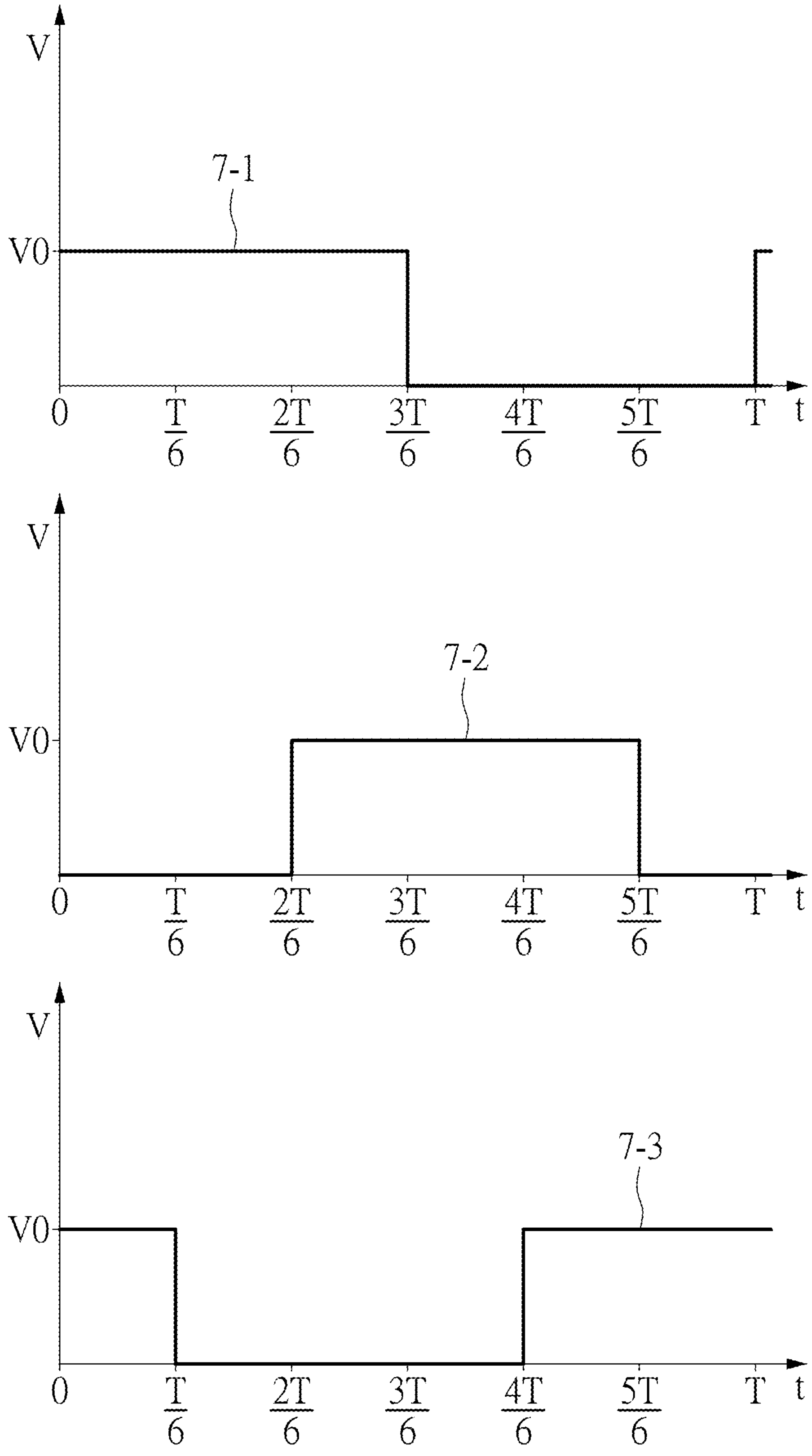
FIG. 18 is a signal waveform diagram showing three different control signals correspondingly output by a controller according to one embodiment of the present disclosure.

Reference is made to FIG. 18, in which the waveform diagram of the control signal 7-1, the control signal 7-2 and the control signal 7-3 are shown. Given the ordinate is the voltage V, the abscissa is the time t, and V0 is the turn-on voltage of the flash simulation light source 8, the control signal 7-1, the control signal 7-2 and the control signal 7-3 are three sets of rectangular wave signals, the signal period is the same as T, T is less than 0.1 seconds, which are correspondingly used to control the flash simulation light source 8 as shown in FIG. 8. The control signal 7-1 is used to control turn-on and turn-off of the first light-emitting element 8-1, the control signal 7-2 is used to control turn-on and turn-off of the second light-emitting element 8-2, and the control signal 7-3 is used to control turn-on and turn-off of the third light-emitting element 8-3. According to the positive voltage duration calculation formula 3T/2n, the phase difference calculation formula 360°/n and the principle that the number of control signals is equal to the number of colors of the light-emitting elements, it can be seen that n is equal to 3. The calculation shows that the positive voltage duration of the control signal 7-1, the control signal 7-2 and the control signal 7-3 is consistent with T/2, and the phase difference is consistent with 120°, that is, the phase difference between the control signal 7-2 and the control signal 7-1 is 120°. The positive voltage duration period is 0 to 3T/6, the phase difference between the control signal 7-3 and the control signal 7-2 is 120°, the positive voltage duration period is from 2T/6 to 5T/6, the phase difference between the control signal 7-1 and the control signal 7-3 is 120°, and the positive voltage duration is from 4T/6 to the next cycle of T/6.

Figure 19:
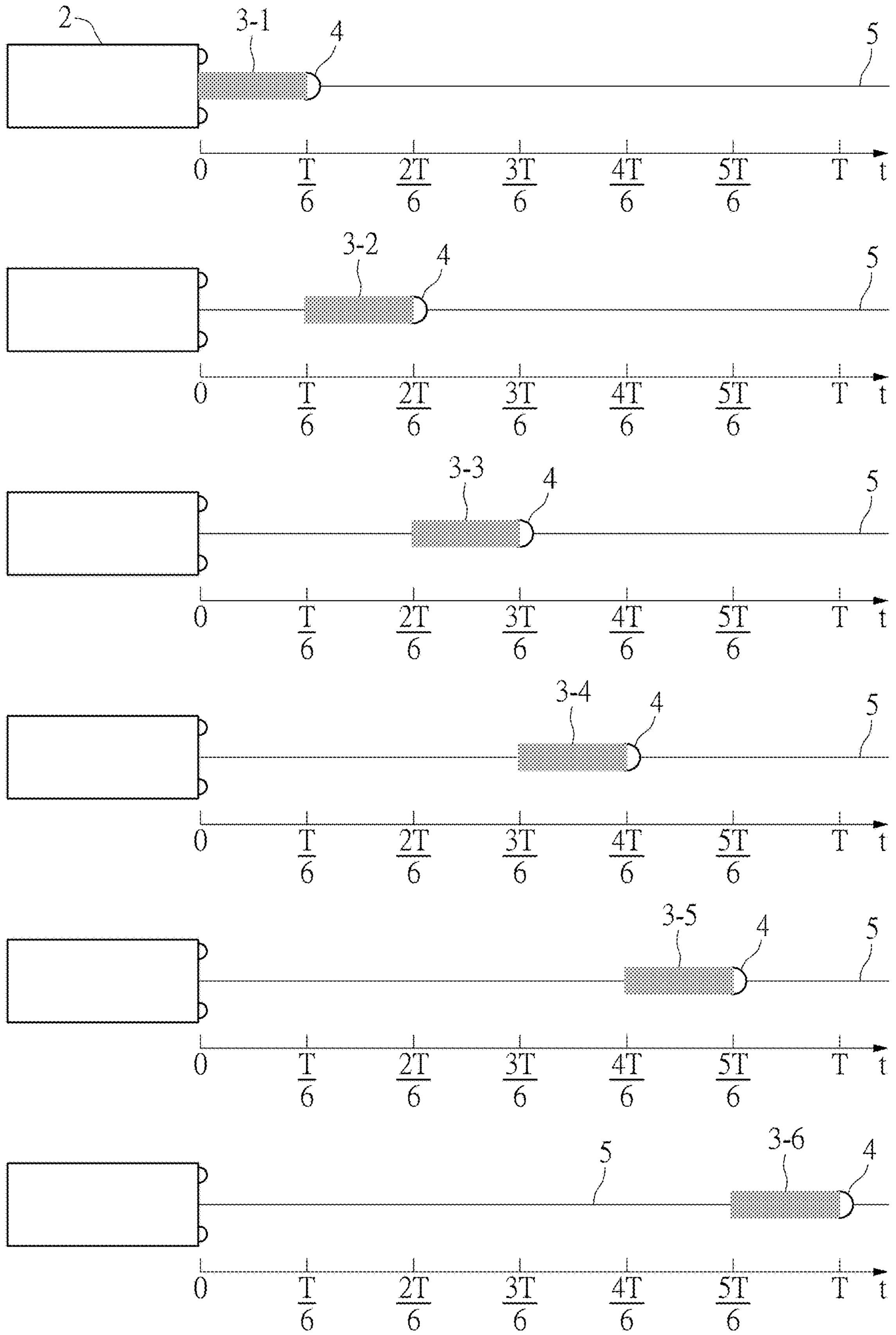
FIG. 19 is a schematic diagram of a mixed light track in which the controller outputs three different control signals and correspondingly controls the luminous brightness, turn-on and turn-off of the light-emitting element according to one embodiment of the present disclosure.

Referring to FIG. 19, when the projectile 4 passes through the muzzle flash simulator 2 and flies along the flight trajectory 5 and away from the muzzle flash simulator 2, the three sets of control signals can show periodic changes, and the colors of the three light-emitting elements having different colors illuminated by the projectile 4 change periodically under the respective control of the three sets of control signals. That is, in the time period from 0 to T/6, since the control signal 7-1 and the control signal 7-3 reach the turn-on voltage V0 of the light-emitting element, the first light-emitting element 8-1 and the second light-emitting element 8-2 are lit to illuminate the projectile 4 flying away from the muzzle flash simulator 2 to generate a light track 3-1 within the time period from T/6 to 2T/6, since the control signal 7-1 reaches the turn-on voltage V0 of the light-emitting element, the first light-emitting element 8-1 is lit to illuminate the projectile 4 flying away from the muzzle flash simulator 2 to generate a light track 3-2 within the time period from 2T/6 to 3T/6, since the control signal 7-1 and the control signal 7-2 reach the turn-on voltage V0 of the light-emitting element, the first light-emitting element 8-1 and the second light-emitting element 8-2 are lit to illuminate the projectile 4 flying away from the muzzle flash simulator 2 to generate a light track 3-3 within the time period from 3T/6 to 4T/6, since the control signal 7-2 reaches the turn-on voltage V0 of the light-emitting element, the second light-emitting element 8-2 is lit to illuminate the projectile 4 flying away from the muzzle flash simulator 2 to generate a light track 3-4 within the time period from 4T/6 to 5T/6, since the control signal 7-2 and the control signal 7-3 reach the turn-on voltage V0 of the light-emitting element, the second light-emitting element 8-2 and the third light-emitting element 8-3 are lit to illuminate the projectile 4 flying away from the muzzle flame simulator 2 to generate a light track 3-5 within the time period from 5T/6 to T, since the control signal 7-3 reaches the turn-on voltage V0 of the light-emitting element, the third light-emitting element 8-3 is lit to illuminate the projectile 4 flying away from the muzzle flash simulator 2 to generate a light track 3-6. At the beginning of the next signal period T, the light track starts to cycle from the light track 3-1, thus forming a long light track 3 with different colored short light tracks connected at the beginning and end.

Figure 20:
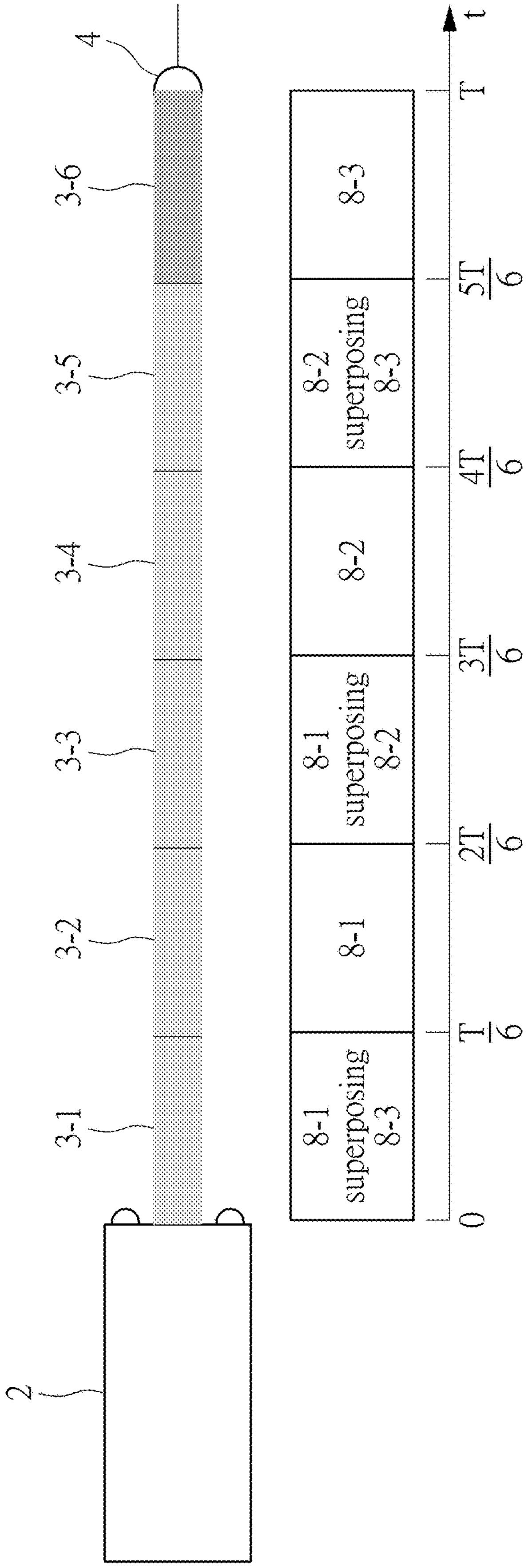
FIG. 20 is a schematic diagram of a periodic mixing of light tracks according to one embodiment of the present disclosure.

Referring to FIG. 20, the projectile 4 flies at a certain speed and moves away from the muzzle flash simulator 2. The light shining on the surface of the projectile 4 is reflected back and enters the naked eye to form the light track. Due to the visual residual effect of the human eye, the user can observe the light track 3-1, the light track 3-2, the light track 3-3, the light track 3-4, the light track 3-5 and the light track 3-6 that form a continuous light track in the sky at the same time. Since the first light-emitting element 8-1, the second light-emitting element 8-2 and the third light-emitting element 8-3 are light-emitting elements of three different colors, the resulting light tracks 3-1, 3-2, 3-3, 3-4, 3-5 and 3-6 are light tracks of different colors, namely the light track 3-1 is the color of the light generated by superposing the first light-emitting element 8-1 and the third light-emitting element 8-3, the light track 3-2 is the color of the light generated by the first light-emitting element 8-1, the light track 3-3 is the color of the light generated by superposing the first light-emitting element 8-1 and the second light-emitting element 8-2, the light track 3-4 is the color of the light generated by the second light-emitting element 8-2, the light track 3-5 is the color generated by superposing the second light-emitting element 8-2 and the third light-emitting element 8-3, the light track 3-6 is the color of the light generated by the third light-emitting element 8-3. Therefore, in conjunction with FIG. 5 and FIG. 13, in the present disclosure, within the signal period T, the projectile 4, under the illumination of the muzzle flame simulator 2, can generate the long light track 3 including six light tracks of different colors connected at the beginning, as if a rainbow. Therefore, the light track is also called a rainbow light track.

In the embodiments of the present disclosure, by setting up a variety of light-emitting elements having different colors and emitting light having different brightness and colors to the projectile under the control of the controller, since the control signal generated by the controller changes periodically, the luminous effects of the light-emitting elements having different colors are reflected in the projectile while the projectile is flying, and the color of the projectile's flight trajectory also changes accordingly. Due to the visual residual effect of the human eye, when the period in which the controller generates the control signal is less than the visual residual time of the human eye, the human eye will simultaneously observe a long light track in the air consisting of small segments of light tracks having different colors connected in series, as if a rainbow. The control software can be simplified, the requirements for controller performance can be reduced, and there is no need to use a luminous projectile, which can reduce costs.

Each module in the above-mentioned muzzle flash simulator can be partially implemented through software, hardware and combinations thereof. Each of the above modules can be embedded in the processor of the computer device in the form of hardware or independent of it, and can be stored in the memory of the computer device in the form of software, so that the processor can invocate and execute the operations corresponding to the above modules.

Figure 21:
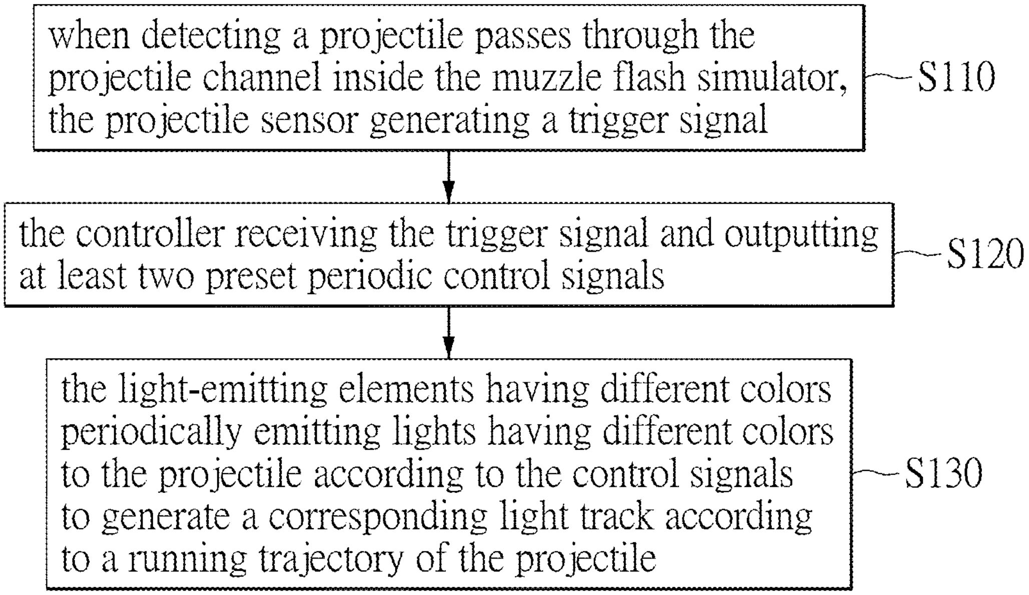
FIG. 21 is a schematic flowchart of a light track generation method according to one embodiment of the present disclosure.

Reference is made to FIG. 21, an implementation flow chart of a light track generation method is provided, which is applied to the muzzle flash simulator and specifically includes the following steps.

- S110: when detecting a projectile passes through the projectile channel inside the muzzle flash simulator, the projectile sensor generating a trigger signal;
- S120: the controller receiving the trigger signal and outputting at least two preset periodic control signals; and
- S130: the light-emitting elements having different colors periodically emitting lights having different colors and different intensities to the projectile according to the control signals to generate a corresponding light track according to a flight trajectory of the projectile.

In the embodiments of the present disclosure, the projectile channel is detected in real time through the preset projectile sensor. When detecting the projectile passes through the projectile channel, the trigger signals are sent to the controller. At this time, the controller generates the at least two signals through the signal generator circuit. The light-emitting elements generate strong light under the control of the control signal and shines on the projectile flying away from the projectile channel. The strong light is reflected to the human eye through the surface of the projectile. The human eye will observe the flight trajectory of the projectile in the air. Since the control signals generated by the controller change periodically, the luminous effects of the light-emitting elements having different colors change periodically under the control of the control signal while the projectile is flying, and the color of the projectile's flight trajectory also changes accordingly. Due to the visual residual effect of the human eye, when the period in which the controller generates the control signals is less than the visual residual time of the human eye, the human eye will simultaneously observe a long light track in the air consisting of small segments of light tracks having different colors connected in series, as if a rainbow.

In the embodiments of the present disclosure, at least two control signals that periodically change being output according to the trigger signals include: presetting the period, phase difference and positive voltage duration of the control signal to generate and output the at least two control signals that periodically change according to the trigger signals.

Specifically, different types of toy air guns, as well as different types of projectile, lead to different flight trajectories of projectile. For example, flight height, flight length, flight arc, etc. are different. Therefore, when configuring the control signal, the type of toy air gun and the type of projectile launched can be obtained and used to configure the corresponding period, phase difference and positive voltage duration so that the light track can meet the flight trajectories of different projectiles.

In an embodiment of the present disclosure, of the multiple projectile sensors are provided, and the steps of the controller receiving the trigger signal and outputting at least two control signals that periodically change includes: the controller receiving different trigger signals transmitted by each of the multiple projectile sensors, and triggering and opening different control channels according to the different trigger signals for outputting corresponding control signals that periodically change to correspondingly control turn-on, turn-off and luminous brightness of the light-emitting elements having different colors.

Specifically, the projectile sensor may include one or more. When the number of projectile sensor is one and the projectile sensor detects the passage of the projectile, the projectile sensor can generate the trigger signal and transmit the trigger signal to the controller. The controller can generate the control signal according to the trigger signal, and control the light-emitting elements to periodically emit light having different colors based on the control signal. When the multiple projectile sensors are provided and the projectile passes through, each projectile sensor can detect the projectile and correspondingly generate the trigger signal, and transmit the trigger signal to the controller. At this time, the controller opens different control channels based on the plurality of trigger signals, and transmits different control signals to different light-emitting elements through the different control channels to control the different light-emitting elements to output periodically changing light to form an approximate rainbow light track 3.

In the embodiments of the present disclosure, by arranging the light-emitting elements having different colors and emitting light having different intensities and colors to the projectile under the control of the controller, since the control signal generated by the controller 7 changes periodically, the luminous effects of the light-emitting elements having different colors change periodically under the control of the control signals while the projectile is flying, and the color of the flight trajectory of the projectile also changes accordingly. Due to the visual residual effect of the human eye, when the period of the control signal generated by the controller 7 is less than the visual residual time of the human eye, the human eye will simultaneously observe a long light track in the air consisting of small light tracks having different colors connected in series, as if a rainbow. The control software is simplified, the requirements for controller performance are reduced, and there is no need to use luminous projectile, which can reduce costs.

It should be understood that the sequence number of each step in the above embodiment does not mean the order of execution. The execution order of each process should be determined by its function and projectile logic, and should not constitute any limitation on the implementation process of the embodiment of the present disclosure.

Those skilled in the art can clearly understand that for the convenience and simplicity of description, it is only exemplified in terms of the functional units and modules mentioned above. In actual applications, the above functions can be allocated to different functional units and modules according to needs. Module completion means dividing the projectile structure of the device into different functional units or modules to complete all or part of the functions described above.

The above-described embodiments are only used to illustrate the technical solutions of the present disclosure, but not to limit thereto. Although the present disclosure has been described in detail with reference to the foregoing embodiments, those of ordinary skill in the art should understand that they can still implement the above-mentioned implementations. The technical solutions described in the examples are modified, or some of the technical features are equivalently replaced; and these modifications or substitutions do not cause the essence of the corresponding technical solutions to deviate from the spirit and scope of the technical solutions of each embodiment of the present disclosure, and should be included in within the protection scope of the present disclosure.

What is claimed is:

1. A muzzle flash simulator configured to be installed at a muzzle of a toy air gun, the muzzle flash simulator comprising:

a projectile channel provided inside the muzzle flash simulator, wherein the projectile channel is coaxial with a flight trajectory of a projectile;

at least one projectile sensor connected to a controller and configured to transmit a trigger signal to the controller when detecting the projectile passes through the projectile channel;

wherein the controller is preset to output at least two control signals that periodically change according to the trigger signal; and at least one group of flash simulation light sources connected to the controller, wherein the at least one group of flash simulation light sources includes at least two light-emitting elements having different colors, and the light-emitting elements are configured to periodically emit lights having different colors to the projectile according to the control signals to form a light track;

wherein the controller includes: a signal generator circuit preset to output the at least two control signals that periodically change to correspondingly control turn-on, turn-off and luminous brightness of the light-emitting elements having different colors;

wherein a ratio of a positive voltage duration of the control signal to a period within a cycle is constant;

wherein the positive voltage duration is calculated by the following formula:

$$3T/2n$$

where T is the period, T is less than 0.1 seconds, n is a number of colors of the light-emitting element, and n is greater than 1.

2. The muzzle flash simulator according to claim 1, wherein at least two projectile sensors are provided and configured to correspondingly transmit the trigger signals to the controller to trigger the controller to turn on control signals of different control channels, so as to correspondingly control turn-on, turn-off and luminous brightness of the light-emitting elements having different colors.

3. The muzzle flash simulator according to claim 2, wherein the at least two projectile sensors are arranged in parallel in the projectile channel along a direction of the light trajectory of the projectile, and a distance between adjacent projectile sensors is less than a predetermined distance threshold.

4. The muzzle flash simulator according to claim 2, wherein at least two rows of projectile sensor group are provided in the projectile channel along an axis side of the flight trajectory of the projectile, and each of the at least two rows of projectile sensor group includes at least one projectile sensor.

5. The muzzle flash simulator according to claim 1, wherein a phase difference between two adjacent control signals is calculated by the following formula:

$$360°/n$$

where n is a number of colors of the light-emitting element, and n is greater than 1.

6. A light track generation method applied to the muzzle flash simulator as claimed in claim 1, the light track generation method comprising the following steps:

generating, by the projectile sensor, the trigger signal when detecting the projectile passes through the projectile channel inside the muzzle flash simulator;

receiving, by the controller, the trigger signal and outputting the at least two control signals that periodically change; and periodically emitting lights having different colors, by the light-emitting elements having different colors, to the projectile according to the control signals to generate a corresponding light track according to a flight trajectory of the projectile.

7. The light track generation method according to claim 6, wherein multiple projectile sensors are provided, and wherein the step of receiving, by the controller, the trigger signals and outputting the at least two control signals that periodically change includes:

receiving, by the controller, the trigger signal transmitted by each of the multiple projectile sensors, and triggering and opening different control channels according to the trigger signal transmitted by each of the multiple projectile sensors and outputting corresponding control signals that periodically change through the different control channels to correspondingly control turn-on, turn-off and luminous brightness of the light-emitting elements having different colors.

* * * * *